Oct. 30, 1934.  M. J. HOFFMAN  1,978,901
DUAL PRODUCTION AND COST CONTROL RECORDER
Filed March 3, 1933   2 Sheets—Sheet 1
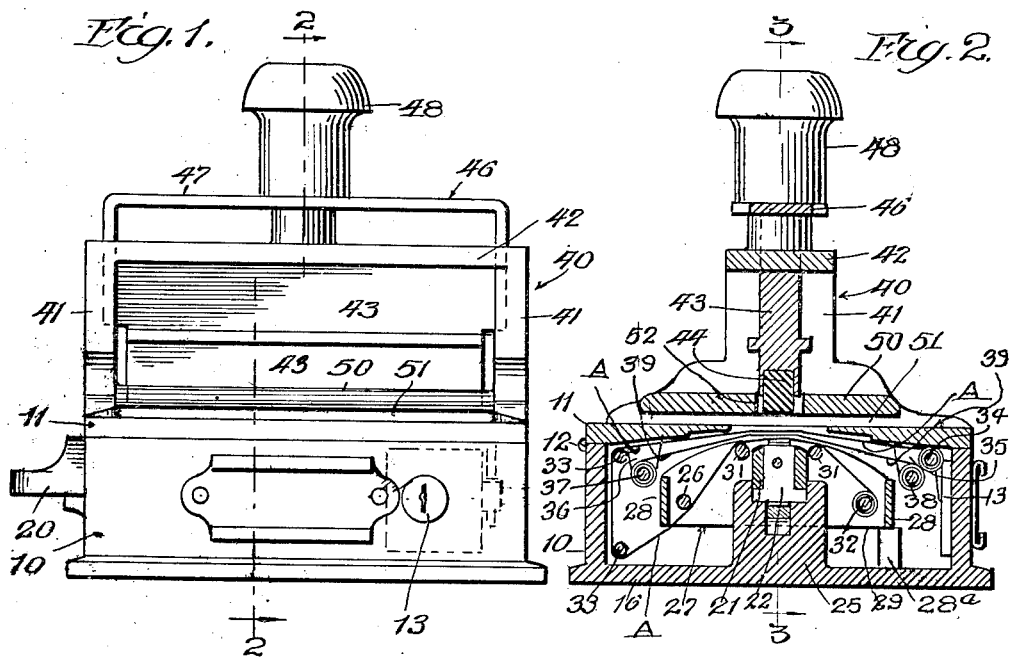
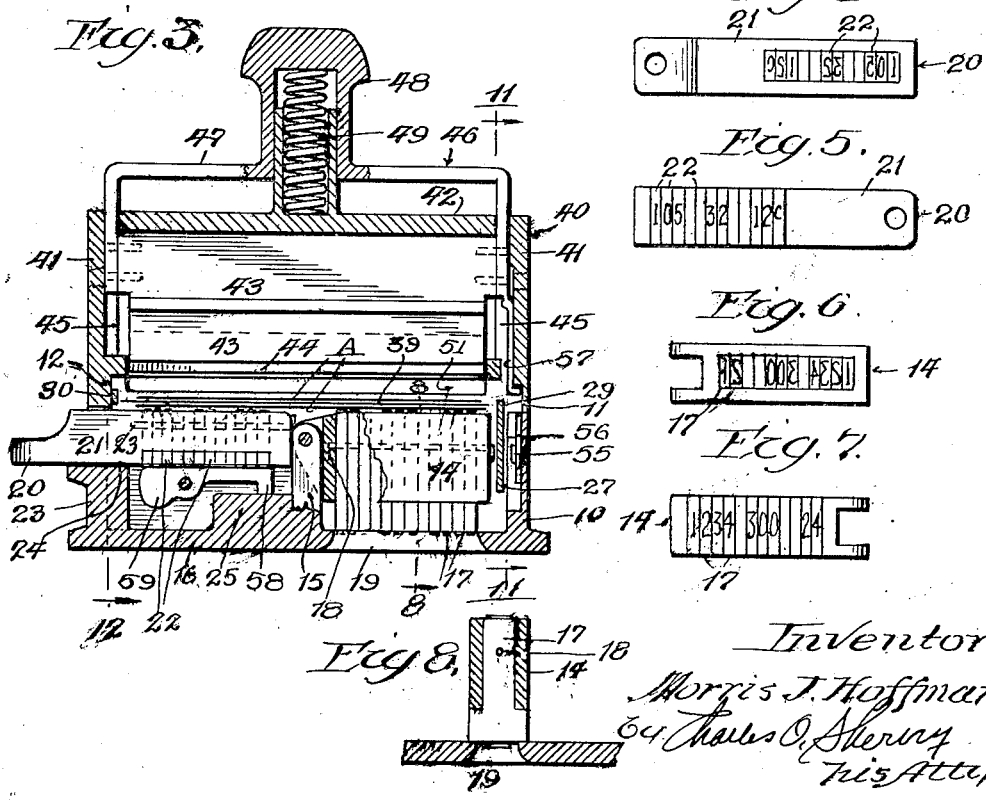

Oct. 30, 1934.    M. J. HOFFMAN    1,978,901
DUAL PRODUCTION AND COST CONTROL RECORDER
Filed March 3, 1933    2 Sheets-Sheet 2
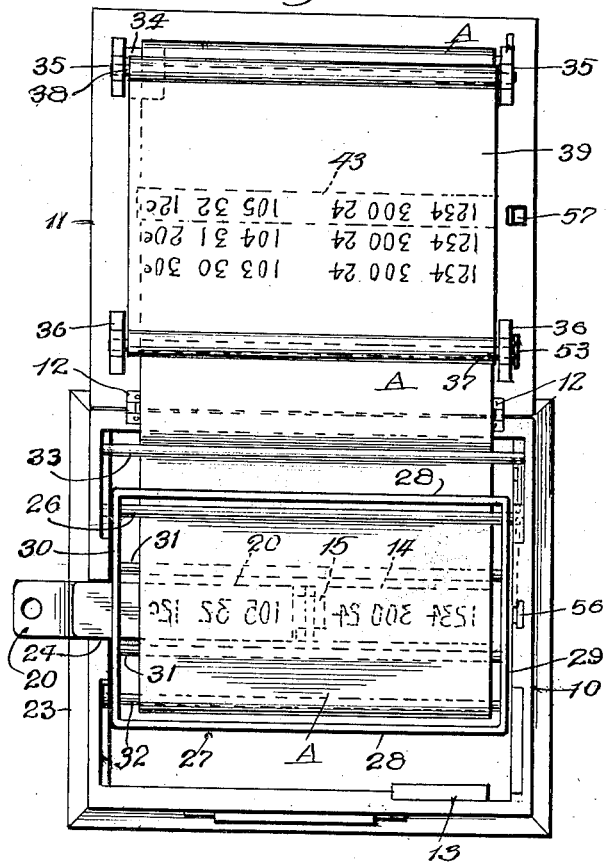
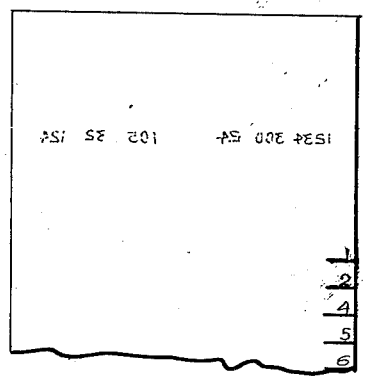
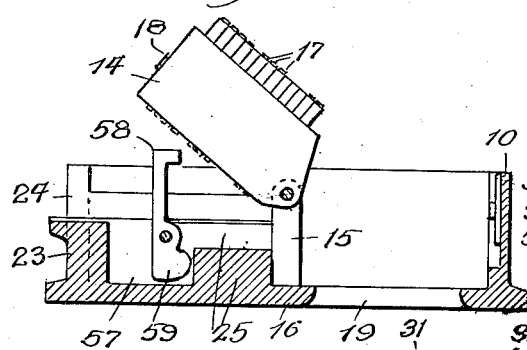
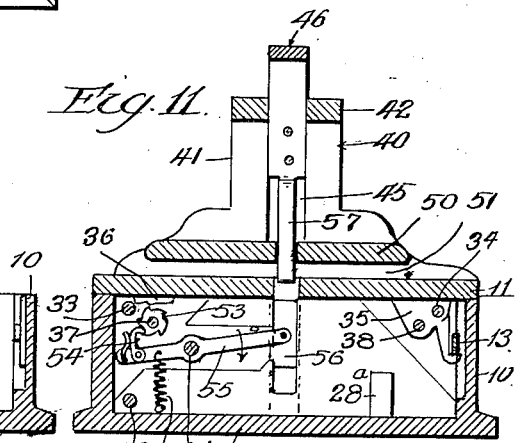
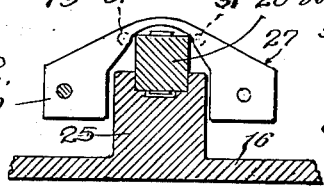
Inventor:
Morris J. Hoffman,
by Charles O. Sherry
his Atty Patented Oct. 30, 1934

1,978,901

UNITED STATES PATENT OFFICE 1,978,901

DUAL PRODUCTION AND COST CONTROL RECORDER

Morris J. Hoffman, Chicago, Ill., assignor, by mesne assignments, to International Business Machines Corporation, New York, N. Y., a corporation of New York Application March 3, 1933, Serial No. 659,528

5 Claims. (Cl. 201—96)

This invention relates to dual production and cost control recorders and its principal object is to simplify and otherwise improve upon recorders of this character.

The present invention has particular reference to recorders adapted for simultaneously making records on a workman's time card or other slip individual to the workman who performs labor on an article and on a record strip which is key locked in the recorder. A recorder of this character travels with the job or is kept in a suitable place where the workmen may have ready access to it. The device has been designed to discourage dishonesty among the workmen, to simplify the task of keeping account of the workmen's time and to provide a check against inaccuracies.

With these and other objects and advantages in view, this invention consists in a recorder, having settable or interchangeable type, key locked therein for printing fixed data, such as the job number, style and quantity, and workmen's individual key inserts having settable and interchangeable type, locked therein for printing data such as the workman's individual operation in the articles, his clock number and the rate or price paid for the work.

It further consists in a recorder as above set forth having a record strip and a single ink ribbon arranged for simultaneously making impressions on the record strip and on the workman's time card or slip. The invention further consists in the several novel features hereinafter fully set forth and claimed.

The invention is clearly illustrated in the accompanying drawings in which:

Fig. 1 is a front elevation of a dual production and cost control recorder embodying a sample form of the present invention;

Fig. 2 is a vertical cross section thereof taken on the line 2—2 of Fig. 1;

Fig. 3 is a vertical longitudinal section taken on the line 3—3 of Fig. 2;

Fig. 4 is a plan of one of the workmen's individual key inserts;

Fig. 5 is a view of the key insert looking at the bottom thereof;

Fig. 6 is a plan of the fixed data printing element;

Fig. 7 is a view of said printing element looking at the bottom thereof;

Fig. 8 is a detail vertical cross section through said printing element and a fragment of the bottom taken on the line 8—8 of Fig. 3;

Fig. 9 is a plan of the recorder opened up;

Fig. 10 is a central longitudinal section through the base with the workmen's key insert removed and the fixed data printing element swung back to enable the type to be changed;

Fig. 11 is a detail vertical cross section taken on the line 11—11 of Fig. 3;

Fig. 12 is a detail fragmental section taken on the line 12—12 of Fig. 3;

Fig. 13 is a face view of a fragment of a workman's time card with one record made thereon.

Fig. 14 is a view of the back of said time card.

Referring to said drawings, which are merely illustrative of one form of the invention, the reference character 10 designates a hollow base or housing open at the top, and closed by a cover 11 hinged at the back to the base by hinges 12 and key locked to the base by a key lock 13, whereby the operative mechanism within the base is safeguarded against tampering.

Supported within and movably mounted to extend longitudinally in the base is a type holder 14, here shown as pivotally mounted on a post 15 rising from the bottom wall 16 of the base, the type holder being adapted to be swung up into position for setting the type therein (see Fig. 10). The type holder 14 has a vertical longitudinal slot therein, in which T shaped type 17 are set and locked in place by a pin 18 that is insertable through registering holes in the end wall of the type holder and in the type. When in printing position, the type rest on the bottom wall of the base, which takes up the pressure when the recorder is actuated. Each type has a type character such as one one of the digits 0 to 9 on the end which is held uppermost by the type holder and it has a similar character, raised or printed on its opposite or lower end, whereby one can readily read the data printed by the type. An opening 19 is formed in the bottom wall, through which the characters on the lower ends of the type are exposed, which enables one to observe said data although the cover is locked down on the base. To set type in the type holder, the latter is swung up and back to the inverted position seen in Fig. 10, the pin is withdrawn, the present type replaced with the selected ones and the pin reinserted. The type holder is then swung down upon the bottom wall of the base.

The data printed by the type set in the type holder is fixed data for any lot of articles or job and for example may be the job number, the style of the article and the quantity in the lot. The type holder 14 with set type therein I shall term a "printing element".

For printing data individual to the several workmen in connection with the fixed data printed by the printing element, key inserts 20, individual to the workmen, are provided, which are insertable into the base in line with the printing element, whereby a complete record of any workman's time in connection with a lot or job may be printed. The key inserts comprise a bar like type holder 21 having a vertical slot extending longitudinally therein, and settable T shaped type 22 removably secured therein by a pin 23 which is insertable through registering holes in an end wall in the type holder and in the type. Like the type 17 the type 22 have type characters at the end which are held uppermost when in printing position and raised or printed characters corresponding thereto on the other end.

The wings of the T shaped type form shoulders that rest upon the edges of the side walls of the type holders and align the faces of the type characters.

The side wall 23 of the base is formed with a notch 24 at its upper edge through which the key inserts are inserted into the base, and from said wall extends a grooved supporting and guide block 25, upon which the key inserts are slid into printing position in the base. Conveniently the post 15 may act as a stop for locating the key insert in place. The groove in the supporting and guide block is aligned with the printing element, whereby the data printed by the workman's key insert and by the fixed data printing element may print along a single line.

It is to be observed that each workman is provided with a key insert having type locked therein which print information relative to the individual workman, for example the type may print a number indicating his particular operation on the work, his clock or identification number, and the rate or price he is entitled to be paid for his labor on any lot of articles. The type of the fixed data printing element may print fixed data concerning any lot or jobs as has been explained. The data will of course be appropriate for any given work. Fig. 13 illustrates a time card with the first record printed thereon. Fig. 14 shows the back of the time card. It may be provided with numbered guide lines whereby the workman may properly locate the time card in the recorder to print on the corresponding line on the other side. For instance the cover may have an arrow or other indicator with which the workman lines up the proper numbered line on the back of the time card when inserting it into the recorder to make a record.

Swingably mounted on a rod 26, in the base is a ribbon holder 27, the free end of which rests on lugs 28ª, or other supports contained in the base. The ribbon holder comprises two side frame bars 28, an end bar 29 and an arched end bar 30. The arch is provided to accommodate the guide block 25 and permit the key inserts to be inserted into the groove of the block. Two parallel rods 31 connect the end bars 29, 30 at places adjacent the tops of the type and hold the ink ribbon, seen at A over the type characters, and a spindle 32 is rotatively held in the end bars, and has one end of the ribbon secured thereto.

Two guide rods 33, 33 are mounted in the base adjacent the hinged end of the cover, and the ink ribbon passes around said guide rods as seen in Fig. 2, and then across the open top of the base to a spindle 34, which is rotatively mounted in bearing lugs 35, that depend from the cover (see Fig. 11). The ink ribbon is wound upon the spindles 32, 34 and may be wound from one to the other to present unworn portions to the type characters. That part of the ink ribbon wound on the spindle 34 moves up with the cover when the latter is raised to expose the parts contained in the base.

Rotatively mounted in the lugs 35 and in lugs 36, also depending from the cover are two spindles 37, 38, around both of which are wound the ends of a record strip 39, which extends from one spindle 37 to the other one 38, and leads through the space between the part of the ink ribbon carried by the cover and the part extending over the guide rods 31. Impressions are simultaneously made by the type and interposed ribbons, on the record strip and on the time card. The ribbon holder may be swung upward on the rod 26 to obtain access to the type holder below, when the type need resetting or for any other purpose. After each impression is made, the record strip is advanced automatically as will presently appear.

Extending up from the cover is an arch 40, composed of end posts 41, and a cross piece 42 in which an impression bar 43 is guided for vertical reciprocation. The impression bar carries a rubber or other pliable strip 44 on its lower edge which occupies a position over the type and is pressed down upon the time card when making an impression. The bar 43 is guided in vertical grooves 45 in the posts and is attached to a bail, 46 which has a cross bar 47 above the top of the arch, on which is mounted a knob 48, and interposed between the arch and cross bar or knob is a coiled compression spring 49, which serves to raise the impression bar after it has been forced down to make an impression.

Extending between the posts of the arch and spaced slightly above the cover is a guide plate 50, which provides a narrow slot 51, directly above the cover, through which the time cards are inserted when an impression is to be made thereon. The plate 50 is formed with a longitudinal slot 52, and the cover is provided with a similar slot therebelow to permit the impression bar to pass through in making an impression.

For automatically advancing the record strip each time an impression is made so that they may be made one under the other, I provide a ratchet wheel 53 on one end of the spindle 37 and a pawl 54 on a spring actuated lever 55, fulcrumed on an end wall of the base, and having a block 56 on one end guided in a groove in said end wall and arranged to be depressed by a finger 57, which extends down from the impression bar. Each time the impression bar is struck down, the finger depresses the block 56, swings the lever in the direction of the arrow thereon and raises the pawl into position for engagement with a tooth of the ratchet wheel. When the impression bar rises the spring 58 draws the pawl down thereby advancing the ratchet wheel one step and partially rotating the spindle and winding a small part of the record strip thereon, thereby advancing the record strip one step or space.

To prevent persons from making an impression unless a key insert is in place in the base, a dog 58 is provided in the guide block 25 swingably mounted in a recess therein and having a weighted end 59 arranged to hold the dog upright. The dog is of such length that its upper end when upright, forms a stop above the type characters and will be encountered in case the impression bar is struck down, thereby preventing the impression bar from moving down far enough to make an impression. The dog stands in the path of a key insert when the latter is being inserted, and is swung down out of active position by the key when the latter is inserted. This position is seen in Fig. 2. Its inactive position is illustrated in Fig. 10.

In use, the fixed data printing element is set with type to print the fixed data for any given lot or job and the cover is locked down on the base, thereby preventing unauthorized persons from tampering with the fixed data printing element, and thus insuring the printing of the correct fixed data. The several workmen's key inserts are set with appropriate type to print the data individual to the workmen, and each key insert is kept under the control of the workman designated thereby. When a workman has completed his work upon the lot of articles identified by the fixed data printing element, he inserts his key in the base, inserts his time card into the slot 51 and depresses the impression bar thereby simultaneously making impressions upon his time card and on the record strip. Each workman performing labor upon the same lot or job does the same, using his own key insert and time card.

Records are thus kept on the individual time cards showing the wages due the workmen, and on the record strip showing the complete information regarding the work done on the lot or job. The total cost of the work must agree with the predetermined fixed cost. If the total shows more than the fixed cost, an inspection of the record will show the inaccuracy at a glance.

I claim as new and desire to secure by Letters Patent:

1. In a recorder the combination of a hollow base, a printing element mounted therein, said base having a guide way therein, a key insert slidable in said guide way, an impression bar mounted for movement toward and away from said printing element, and a dog in said base operating to obstruct movement of the impression bar toward the printing element, said dog being located in the path of sliding movement of the key insert whereby the key insert, when inserted, serves to move the dog to inactive position.

2. In a recorder, the combination of a hollow base having an open top, a hinged cover therefor, a type holder mounted in said base, a ribbon holder swingably mounted in said base, and having rods for holding a portion of an ink ribbon over said type holder, one end of said ribbon being carried by said ribbon holder and one end extending above said part of the ribbon located over the type holder and being carried by the cover, and a record strip interposed between said parts of the ink ribbon.

3. In a recorder, the combination of a hollow base having an open top, a cover hinged to the base and having an arch rising therefrom, an impression bar guided in said arch, a type holder in the base, key controlled means for preventing withdrawal of said type holder from the base, and a key insert, insertable into said base in alignment with said printing element.

4. In a recorder, the combination of a hollow base, a cover key locked thereto, a fixed data printing element contained in the base, key controlled means for preventing withdrawal of said type holder from the base, a key insert insertable into the base for association with the fixed data printing element to print a complete record, an ink ribbon having one end attached in the base and one end attached to and movable with the cover, means in the base to guide said ink ribbon over the fixed data printing element and a key insert in two planes, a record strip extending through the space between the two planes in which the ink ribbon extends, means to carry said record strip, and impression making means co-operating with said fixed data printing element, key insert and ribbon to simultaneously make impressions on the record strip and an insertable card.

5. In a recorder, the combination of a housing having a hinged cover, a plurality of printing elements having interchangeable type mounted therein, one of said printing elements being pivotally attached to said housing, another of said printing elements being slidably insertible into said housing, and key locking means on said housing for solely preventing withdrawal of said first mentioned printing elements, the last mentioned printing element being freely removable from said housing irrespective of the effectiveness of said key locking means.

MORRIS J. HOFFMAN.